(No Model.)

A. E. CHOATE.
SEED PLANTER.

No. 322,421. Patented July 21, 1885.

WITNESSES:

INVENTOR:
A. E. Choate
BY Munn & Co.
ATTORNEYS.

UNITED STATES PATENT OFFICE.

AUGUSTUS EDWARD CHOATE, OF COCHRAN, GEORGIA.

SEED-PLANTER.

SPECIFICATION forming part of Letters Patent No. 322,421, dated July 21, 1885.

Application filed May 28, 1884. (No model.)

*To all whom it may concern:*

Be it known that I, AUGUSTUS E. CHOATE, of Cochran, Pulaski county, Georgia, have invented a new and Improved Coverer for Seed-Planters, of which the following is a full, clear, and exact description.

The object of my invention is to provide an efficient, easily-worked, and durable coverer for attachment to seed-planters, and one which will ridge the earth over the seed sufficiently to obviate the first plowing usually required for that purpose after the use of the ordinary board coverers.

The invention consists in a pair of spring-bars adapted to be attached at their forward ends to the frame of the planter, and having the coverer arms and plates connected at their back ends by rear bolts and at the front by laterally-elongated loops to permit varying the angle of the plates to throw more or less earth, and having also a pair of upwardly-convergent bars, which tie the back ends of the mainspring-bars together, and have springs at their inner faces to hold the coverer-plates to their work, and permit them to rise or shift laterally in passing obstructions.

The invention includes, also, various details of construction and combinations of parts of the coverer, all as hereinafter fully described and claimed.

Reference is to be had to the accompanying drawings, forming part of this specification, in which similar letters of reference indicate corresponding parts in both the figures.

Figure 1:
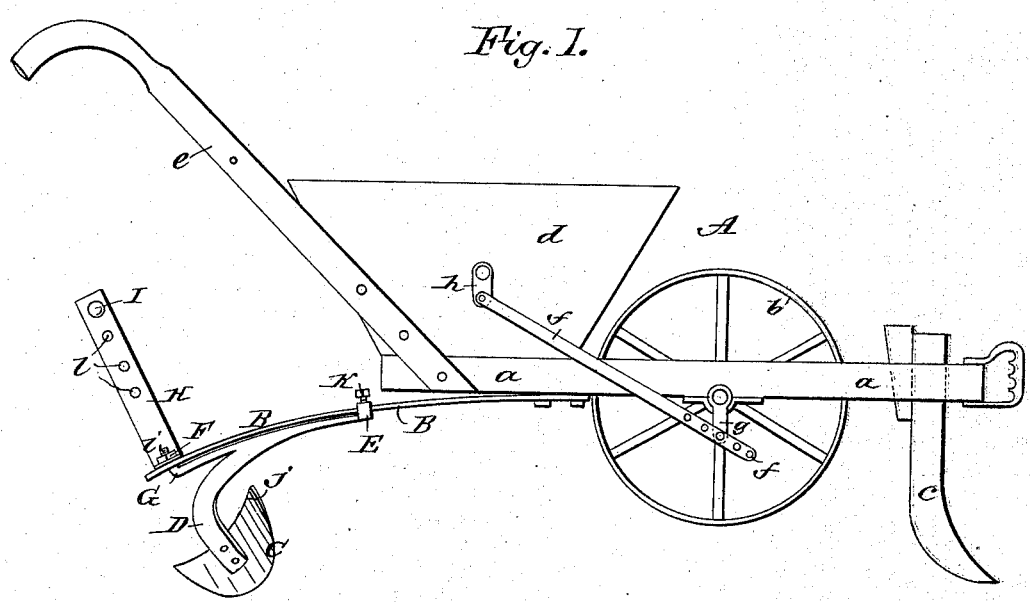
Figure 2:
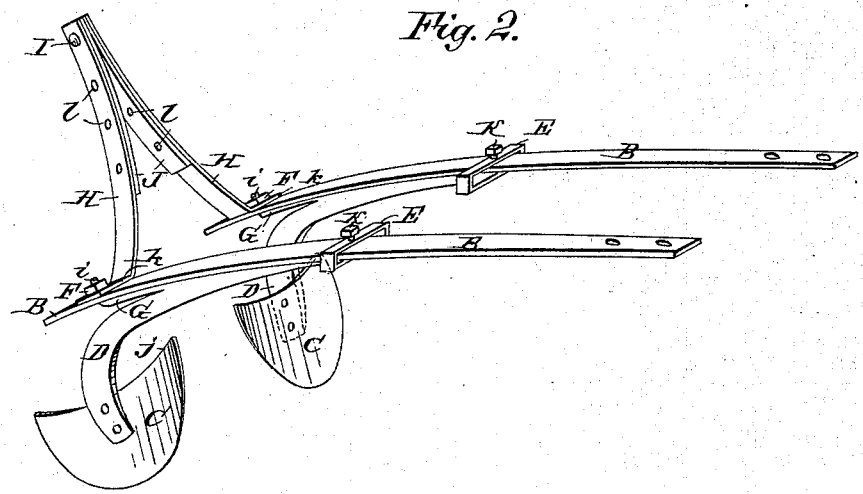

Figure 1 is a side elevation of a seed-planter with my improved coverer applied, and Fig. 2 is a perspective view of the coverer detached from the planter and drawn to a larger scale.

The letter A indicates an ordinary seed-planter, which has beams $a$, wheel $b$, drill-opener $c$, seed-hopper $d$, handles $e$, and devices, such as a connecting-rod, $f$, and cranks $g$ $h$ to operate any approved style of mechanism for dropping seed or a fertilizer from the hopper.

The planter may have any desired construction, as it forms no part of my invention, which latter I describe as follows:

B B are spring-bars fastened to the beams $a$ of the planter by bolts passing through the forward ends of the bars. These bars B extend backward, preferably, in a downward curve, and so as to support the coverers at the proper height.

I make the coverers C of metal plates having rounded outer edges, and fix them by bolts or otherwise to the lower ends of the curved bars or arms D, which connect with the bars B at their forward ends by laterally-elongated eyes or loops E, through which the spring-bars B are passed, and at their rear ends by nuts F, screwed above the bars upon the upturned ends $i$ of rods G, extending backward from the arms D, and rigidly connected therewith in any approved way, as by welding of the rods to the arms, or by forming the rods of parts of the arms split off and turned up from the main bodies of the arms, as shown.

I shape the coverers C with their forward edges extended upward considerably at the corners, as at $j$, to prevent catching of the plates in the earth and avoid surface-trash or other obstructions by more readily passing over or around them, the elasticity of the bars permitting the coverers to rise or spring sidewise for this purpose.

I connect the back ends of the bars B to each other by bars or plates H, which have foot bends or flanges $k$ to lie flat on the bars, and through which flanges $k$ bolts may pass to secure the lower ends of the bars H. I prefer to have the bolt ends $i$ of the arms D extend through both the bars B and the flanges $k$, so that the one nut, F, serves to hold the coverer C and the bar or plate H to the bar B, as shown.

The bars H H of the two spring-bars B B rise convergently to meet and be fastened together by a bolt, I, and so as to afford space between the bars to pass or bridge over growing plants as the machine moves along the drill. Inside springs, J, are placed along the bars H, and are fastened by the bolt I, which holds the bars to each other, said springs serving to press the bars H H and spring-bars B B outward or from each other, and hold the coverers C C at an even distance apart for good work. The bars H H and their springs J J have a series of coinciding holes, $l$, so that the bolt I may be moved down from the tops of the bars, where shown, to bind the bars and springs H J together at a lower point in their length, to bring the coverers C C closer together, or to brace the coverers more firmly to each other when working in hard or crusted earth. The coverers C C are fixed to arms D at an angle in horizontal plane, or with their rear ends approaching each other suitably to throw the earth over the seed as the seed falls into the drill; and I have made the eyes or loops E long to permit moving them laterally over the spring-bars B, to shift the forward ends of the arms D and vary the angle of the coverers to throw more or less earth over the seed, as may be required. Set-screws K, passing through the loops E against the bars B, serve to lock the coverer-arms G and coverers in any desired angular position. The bars B B may be the same as are used to secure the ordinary board coverers to the planter; hence my improved coverers may readily be substituted for the boards at small expense, and the change from one to the other style may so quickly be made that either may be used in different parts of the same field where the nature of the ground would favor the use of one over the other; but generally my improved coverers will be preferred for work in covering cotton-seed or corn, and, if desired, a corn-planter without coverers may precede the machine represented in the drawings to drop the corn, and be followed by the latter machine, carrying a fertilizer in the hopper d, which may be dropped over the seed, which is then covered by the coverers C C, as will readily be understood.

My improved coverers cover cotton-seed on smooth freshly-bedded land equally as well as the board coverers, and will work quite as well on crusted or rooty earth, where the board coverers cannot be used; and a special advantage of my coverers over the boards is that they save one plowing usually done after the passage of the board coverers to raise a suitable ridge about the plants, as my coverer itself leaves a proper ridge of earth about the seed, so that when the cotton plants come up they may be chopped to a stand.

Having thus described my invention, I claim as new and desire to secure by Letters Patent—

1. A coverer for seed-planters, consisting of the spring-bars B, connected arms D, carrying the coverer-plates C, and bars H, rising from the back ends of bars B, and connected by a bolt, I, substantially as shown and described.

2. The combination, with the spring-bars B, carrying the coverer-arms D and plates C, and the rear tie-bars, H, of the springs J at the inner faces of the tie-bars, substantially as shown and described.

3. The combination, with the bars B and the arms D of the coverers secured at their back ends by bolt ends $i$ and nuts F, of the laterally-elongated loops or eyes E and set-screws K, substantially as shown and described.

4. The combination, in a coverer for seed-planters, of the spring-bars B B, arms D D, carrying coverer-plates C C, and connected to bars B B by the bolt ends $i\ i$ and nuts F F, loops E E, and bolts K K, and the rising convergent bars H H, springs J J, and bolt I, substantialy as shown and described.

AUGUSTUS EDWARD CHOATE.

Witnesses:
GEO. CURRELL, Sr.,
A. RINALDI.